United States Patent
Hack et al.

(10) Patent No.: US 9,380,675 B2
(45) Date of Patent: Jun. 28, 2016

(54) ENERGY SAVING OLED LIGHTING SYSTEM AND METHOD

(71) Applicant: Universal Display Corporation, Ewing, NJ (US)

(72) Inventors: Michael Hack, Ewing, NJ (US); Emory Krall, Ewing, NJ (US); Ruiqing Ma, Ewing, NJ (US)

(73) Assignee: Universal Display Corporation, Ewing, NJ (US)

( * ) Notice: Subject to any disclaimer, the term of this patent is extended or adjusted under 35 U.S.C. 154(b) by 0 days.

(21) Appl. No.: 14/682,551

(22) Filed: Apr. 9, 2015

(65) Prior Publication Data

US 2015/0305114 A1 Oct. 22, 2015

Related U.S. Application Data

(60) Provisional application No. 61/980,803, filed on Apr. 17, 2014.

(51) Int. Cl.
*H05B 37/02* (2006.01)
*H05B 33/08* (2006.01)

(52) U.S. Cl.
CPC ........ *H05B 33/0896* (2013.01); *H05B 37/0227* (2013.01); *Y02B 20/40* (2013.01)

(58) Field of Classification Search
CPC .......................... H05B 33/0872; H05B 33/0845
USPC .................................. 315/294, 297, 158, 161
See application file for complete search history.

(56) References Cited

U.S. PATENT DOCUMENTS

| | | | |
|---|---|---|---|
| 4,769,292 A | 9/1988 | Tang et al. |
| 5,247,190 A | 9/1993 | Friend et al. |
| 5,703,436 A | 12/1997 | Forrest et al. |
| 5,707,745 A | 1/1998 | Forrest et al. |
| 5,834,893 A | 11/1998 | Bulovic et al. |
| 5,844,363 A | 12/1998 | Gu et al. |
| 6,013,982 A | 1/2000 | Thompson et al. |
| 6,087,196 A | 7/2000 | Sturm et al. |
| 6,091,195 A | 7/2000 | Forrest et al. |
| 6,097,147 A | 8/2000 | Baldo et al. |

(Continued)

FOREIGN PATENT DOCUMENTS

| | | |
|---|---|---|
| EP | 1238981 | 9/2002 |
| JP | 2010/135467 | 6/2010 |

(Continued)

OTHER PUBLICATIONS

Baldo et al., "Highly Efficient Phosphorescent Emission from Organic Electroluminescent Devices," Nature, vol. 395, 151-154, (1998).

(Continued)

*Primary Examiner* — Don Le
(74) *Attorney, Agent, or Firm* — Riverside Law LLP

(57) ABSTRACT

Described herein are systems, devices, and methods related to adjusting the intensity of specific wavelengths in an illumination panel based on the presence of a person near the panel. By reducing some emitted wavelengths, such as wavelengths associated with blue light, when such wavelengths are not needed or desired, the lifetime and/or efficiency of the lighting panel can be increased. The systems, devices, and methods can be used to reduce energy costs and also to delay the aging of lighting panels.

20 Claims, 3 Drawing Sheets

(56) References Cited

U.S. PATENT DOCUMENTS

| | | |
|---|---|---|
| 6,294,398 B1 | 9/2001 | Kim et al. |
| 6,303,238 B1 | 10/2001 | Thompson et al. |
| 6,337,102 B1 | 1/2002 | Forrest et al. |
| 6,468,819 B1 | 10/2002 | Kim et al. |
| 7,279,704 B2 | 10/2007 | Walters et al. |
| 7,431,968 B1 | 10/2008 | Shtein et al. |
| 7,598,686 B2 | 10/2009 | Lys et al. |
| 7,968,146 B2 | 6/2011 | Wanger et al. |
| 2003/0230980 A1 | 12/2003 | Forrest et al. |
| 2004/0174116 A1 | 9/2004 | Lu et al. |
| 2010/0259182 A1* | 10/2010 | Man .................. H05B 33/0863 315/250 |
| 2011/0069094 A1* | 3/2011 | Knapp ................ G09G 3/2003 345/690 |
| 2012/0306382 A1* | 12/2012 | Maxik ...................... F21S 2/00 315/152 |
| 2013/0026452 A1 | 1/2013 | Kottas et al. |
| 2013/0119354 A1 | 5/2013 | Ma et al. |
| 2014/0056028 A1* | 2/2014 | Nichol ................ G02B 6/0028 362/611 |
| 2014/0265921 A1* | 9/2014 | Collins .................. F21V 19/00 315/297 |
| 2014/0339987 A1 | 11/2014 | Burrows et al. |
| 2015/0188631 A1* | 7/2015 | Harbers ............. H05B 33/0803 398/119 |
| 2015/0236225 A1* | 8/2015 | David .................. H01L 33/502 257/98 |
| 2015/0273092 A1* | 10/2015 | Holub ...................... A61L 2/10 250/492.1 |

FOREIGN PATENT DOCUMENTS

| | | |
|---|---|---|
| WO | 2004/111066 | 12/2004 |
| WO | 2008/044723 | 4/2008 |
| WO | 2008057394 | 5/2008 |
| WO | 2010011390 | 1/2010 |
| WO | 2010/111175 | 9/2010 |

OTHER PUBLICATIONS

Baldo et al., "Very high-efficiency green organic light-emitting devices based on electrophosphorescence," Appl. Phys. Lett., vol. 75, No. 1, 4-6 (1999).

* cited by examiner

ENERGY SAVING OLED LIGHTING SYSTEM AND METHOD

CROSS-REFERENCE TO RELATED APPLICATIONS

This application claims priority to U.S. Patent Application Ser. No. 61/980,803, filed Apr. 17, 2014, the entire contents of which are incorporated herein by reference.

PARTIES TO A JOINT RESEARCH AGREEMENT

The claimed invention was made by, on behalf of, and/or in connection with one or more of the following parties to a joint university corporation research agreement: Regents of the University of Michigan, Princeton University, University of Southern California, and the Universal Display Corporation. The agreement was in effect on and before the date the claimed invention was made, and the claimed invention was made as a result of activities undertaken within the scope of the agreement.

FIELD OF THE INVENTION

The present invention relates to systems and methods for improving the efficiency and lifetime of organic light emitting diode (OLED) lighting devices.

BACKGROUND

OLEDs make use of thin organic films that emit light when voltage is applied across the device. OLEDs are becoming an increasingly interesting technology for use in applications such as flat panel displays, illumination, and backlighting. Several OLED materials and configurations are described in U.S. Pat. Nos. 5,844,363, 6,303,238, 5,707,745, and 7,279,704, which are incorporated herein by reference in their entirety.

OLED lighting or illumination devices typically emit light having a warm white color, containing blue and yellow or preferably, blue, green and red. However, the use of blue light often limits the overall lifetime of the device, and thus the blue light component can be the primary limiting factor on the efficiency of a lighting panel. Currently available white OLED lighting panels do not allow for the blue component to be independently controlled because most OLED lighting panels use blue LED with yellow phosphor to generate white light.

A method and apparatus for controlling different colors of LEDs using a controller is described in Lys et al. (U.S. Pat. No. 7,598,686). However, Lys is only directed to generating different colors of light in a lighting device, and is not directed to devices, systems and methods for increasing the lifetime and efficiency of a lighting panel that emits white light by reducing the intensity of wavelengths associated with low lifetime or efficiency when such wavelengths are not needed or desired.

Thus, there is a need in the art for devices and methods that can be used to individually control the wavelengths of light in an OLED lighting panel to improve the efficiency and lifetime of the lighting panel. Described herein are devices and methods that address this unmet need.

SUMMARY

A system for modulating the color output of a light emitting device is described. The system includes at least one light emitting device having at least two individually controllable wavelengths; at least one sensor for detecting the presence of a subject in a designated space; and a controller communicatively connected to the at least one sensor and the at least one light emitting device, wherein the controller directs the at least one light emitting device to change the color output of emitted light when the at least one sensor detects the presence of a subject in the designated space. In one embodiment, the at least one light emitting device is an OLED device. In one embodiment, the at least one light emitting device comprises at least one lighting panel. In one embodiment, each lighting panel is individually controlled. In one embodiment, each lighting panel comprises a blue light emitting region and a yellow light emitting region. In one embodiment, the yellow light emitting region comprises a red light emitting region and a green light emitting region. In one embodiment, the blue and yellow light emitting regions are individually controlled within each lighting panel. In one embodiment, the controller directs the at least one light emitting device to emit yellow light when a subject is not detected by the at least one sensor. In one embodiment, the controller directs the at least one light emitting device to reduce emittance of blue light when a subject is not detected by the at least one sensor. In one embodiment, the blue light emittance is reduced by at least 20%. In one embodiment, the blue light emittance is reduced by at least 50%. In one embodiment, the controller directs the at least one light emitting device to increase emittance of blue light when a subject is detected by the at least one sensor. In one embodiment, the color output change results in emittance of white light from the at least one light emitting device. In one embodiment, the at least one sensor is selected from the group consisting of a thermal sensor, a motion sensor, and a camera. In one embodiment, the at least one light emitting device is configured to emit light in an area outside of the designated space. In one embodiment, the at least one light emitting device is configured to emit light in at least a portion of the designated space. In one embodiment, when a subject is not detected in the designated space the light color temperature of emitted light is less than about 2500 K, and when a subject is detected in the designated space the light color temperature of emitted light is greater than about 2700 K. In another embodiment, when a subject is not detected in the designated space the light color temperature of emitted light is less than about 2000 K, and when a subject is detected in the designated space the light color temperature of emitted light is greater than about 2500 K. In one embodiment, when a subject is not detected in the designated space the luminance of the emitted light is reduced by at least 25% and the power consumption of the light emitting device is reduced by at least 40%. In another embodiment, when a subject is not detected in the designated space the luminance of the emitted light is reduced by at least 50% and the power consumption of the light emitting device is reduced by at least 70%. In one embodiment, when a subject is not detected in the designated space the emission of the controllable wavelength with the shortest lifetime is reduced. In one embodiment, when a subject is not detected in the designated space the emission of the controllable wavelength with the lowest efficiency is reduced.

An OLED lighting device is also described. The device includes a lighting panel having at least two individually controllable wavelength emitting regions; at least one sensor; and a controller communicatively connected to the lighting panel and at least one sensor; wherein the controller individually directs the output of light emitted from the at least one of the at least two individually controllable wavelength emitting regions of the lighting panel based on a signal received from the sensor. In one embodiment, the signal received from the sensor is indicative of the presence or absence of a subject within a designated region. In one embodiment, the two individually controllable wavelength emitting regions are stacked. In one embodiment, the two individually controllable wavelength emitting regions comprise at least one blue light emitting region and at least one yellow light emitting region. In one embodiment, the at least one yellow light emitting region comprises a red light emitting region and a green light emitting region. In one embodiment, the controller directs the lighting panel to emit yellow light when a subject is not detected by the at least one sensor. In one embodiment, the controller directs the lighting panel to reduce emittance of blue light from the at least one blue light emitting region when a subject is not detected by the at least one sensor. In one embodiment, the controller directs the lighting panel to increase emittance of blue light from the at least one blue light emitting region when a subject is detected by the at least one sensor. In one embodiment, the controller directs the lighting panel to emit white light when a subject is detected by the at least one sensor. In one embodiment, the at least one sensor is selected from the group consisting of a thermal sensor, a motion sensor, and a camera.

Also described is a method for increasing the efficiency and lifetime of a light emitting device. The method includes the steps of sensing the presence or absence of a subject within a designated area having a light emitting device with at least two individually controllable wavelengths; directing the light emitting device to emit white light when a subject is present in the designated area; and directing the light emitting device to prohibit emittance of at least one wavelength of light when a subject is absent from the designated area. In one embodiment, the at least one wavelength prohibited when a subject is absent from the designated area is the wavelength with the shortest emission lifetime. In one embodiment, the at least one wavelength prohibited when a subject is absent from the designated area is the wavelength with the lowest emission efficiency. In one embodiment, the light emitting device emits yellow light when a subject is absent from the designated area. In one embodiment, the light emitting device comprises one or more OLED lighting panels. In one embodiment, each lighting panel is individually controlled. In one embodiment, each lighting panel comprises a blue light emitting region and a yellow light emitting region. In one embodiment, the yellow light emitting region comprises a red light emitting region and a green light emitting region. In one embodiment, the blue and yellow light emitting regions are individually controlled within each lighting panel. In one embodiment, the blue and yellow light emitting regions are stacked within each lighting panel. In one embodiment, when a subject is not detected in the designated space the light color temperature of emitted light is less than about 2500 K, and when a subject is detected in the designated space the light color temperature of emitted light is greater than about 2700 K. In another embodiment, when a subject is not detected in the designated space the light color temperature of emitted light is less than about 2000 K, and when a subject is detected in the designated space the light color temperature of emitted light is greater than about 2500 K. In one embodiment, when a subject is not detected in the designated space the luminance of the emitted light is reduced by at least 25% and the power consumption of the light emitting device is reduced by at least 40%. In another embodiment, when a subject is not detected in the designated space the luminance of the emitted light is reduced by at least 50% and the power consumption of the light emitting device is reduced by at least 70%.

DETAILED DESCRIPTION

Figure 1:
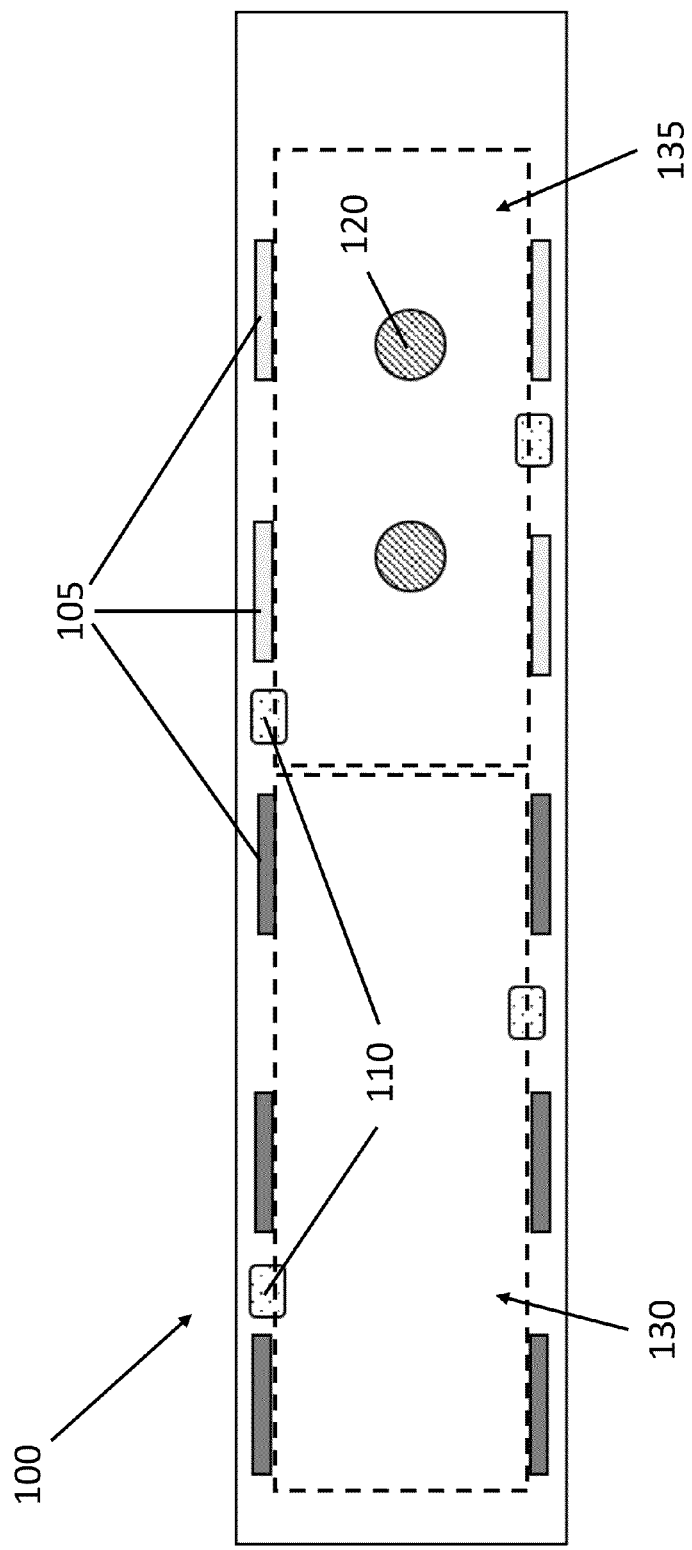
FIG. 1 is a diagram of an exemplary lighting panel system having individually controllable wavelengths.

Unless defined otherwise, all technical and scientific terms used herein have the same meaning as commonly understood by one of ordinary skill in the art to which this invention belongs. As used herein, each of the following terms has the meaning associated with it as described.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate.

As used herein, a "red" light, layer, material, region, or device refers to one that emits light in the range of about 580-700 nm; a "green" light, layer, material, region, or device refers to one that has an emission spectrum with a peak wavelength in the range of about 500-600 nm; a "blue" light, layer, material, or device refers to one that has an emission spectrum with a peak wavelength in the range of about 400-500 nm; and a "yellow" light, layer, material, region, or device refers to one that has an emission spectrum with a peak wavelength in the range of about 540-600 nm. In some arrangements, separate layers, materials, regions, or devices may provide separate "deep blue" and "light blue" light components. As used herein, in arrangements that provide separate "light blue" and "deep blue" light components, the "deep blue" component refers to one having a peak emission wavelength that is at least about 4 nm less than the peak emission wavelength of the "light blue" component. Typically, a "light blue" component has a peak emission wavelength in the range of about 465-500 nm, and a "deep blue" component has a peak emission wavelength in the range of about 400-470 nm, though these ranges may vary for some embodiments.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Described herein are systems, devices, and methods related to adjusting the intensity of specific wavelengths in a lighting panel based on the presence of a person near the panel. While the lifetime of a lighting device can be increased by turning the device off when a room is empty, there are many instances when indoor or outdoor spaces require that an area remain lighted, even when a person is not within a close proximity to the lighting devices. In one embodiment, the lifetime and/or efficiency of the lighting panel can be increased by reducing the emittance of lower efficiency wavelengths, for example blue wavelengths, when a person is not present near the panel. For example, the lighting panel can be used to provide warm white light that includes both blue and yellow wavelengths to an occupied room, but when the room is unoccupied the system can reduce the intensity of, or even eliminate, blue wavelengths from the emitted light. By reducing the blue content of the light, the devices and methods can improve the efficiency and lifetime of lighting panels, thereby reducing energy costs and also delaying the need for replacing the lighting panels.

In one embodiment, the system includes at least one lighting panel device having individually controllable wavelengths, at least one sensor, and at least one controller linked to the sensor and lighting panel. The sensor can be used to detect the presence of a person in a desired area, for example a room in a building. When the sensor detects the presence of a person in the room, the controller coupled to the sensor can direct the lighting panel to illuminate the room with white light having a desired spectrum of wavelengths, for example white light containing blue and yellow wavelengths. When the sensor does not detect the presence of anyone in the room, the controller can direct the lighting panel to reduce or eliminate the emission of blue light. Accordingly, the room will remain illuminated, but the light emitted from the lighting panel will be more yellow than white. By eliminating or at least reducing the emission of blue light, the efficiency and lifetime of the lighting panel can be improved because blue light is generally associated with the lowest efficiency and lifetime of any OLED lighting wavelength.

Referring now to FIG. 1, a diagram of an exemplary embodiment of lighting system 100 is shown. Lighting system 100 includes one or more lighting panels 105. Lighting panels 105 can be any type of light emitting device that includes a mechanism for controlling at least one wavelength or range of wavelengths, for example and without limitation, those associated with relatively low-efficiency light emission. In one embodiment, lighting panels 105 have at least two individually controllable wavelengths. In one embodiment, lighting panels 105 are OLED lighting panels. In one embodiment, lighting panels 105 can have controllable wavelengths corresponding to blue light and yellow light, such that the wavelengths corresponding to blue light can be controlled independently from the wavelengths corresponding to yellow light. In one embodiment, lighting panels 105 can have independently controllable wavelengths corresponding to blue, green, and red light. System 100 also includes at least one sensor 110 and at least one controller (not shown). The controller of system 100 is communicatively coupled with one or more sensors 110 and one or more lighting panels 105 by any standard wired or wireless networking platform as would be understood by those skilled in the art. The controller can be placed in a separate location, or combined with the sensor, or more preferably, placed at the same location as the lighting panels.

Sensors 110 can be any type of sensor that can detect the presence of a subject 120 in a designated area. As contemplated herein, when sensor 110 detects the presence of one or more subjects 120 in a designated area, the controller linked to sensor 110 will direct one or more lighting panels 105 to emit light having a relatively high intensity of blue light. Conversely, when sensor 110 does not detect the presence of subject 120 in the designated area, the controller linked to sensor 110 will direct lighting panels 105 to emit a decreased intensity of blue light, or shut off the emission of blue light entirely. Accordingly, the lifetime and/or efficiency of lighting panels 105 can be increased by avoiding the use of blue light to illuminate an area when the blue light is not needed or desired.

In various embodiments, the blue light emittance of one or more lighting panels 105 can be reduced by at least 5%, 10%, 20%, 30%, 40%, 50%, 60%, 70%, 80%, 90%, 95% or more, or any value in between, in response to an input from one or more sensors 110. In another embodiment, the blue light emittance of one or more lighting panels 105 is fully eliminated. In one embodiment, the controller can adjust the intensity of a light other than blue light, for example any other wavelength or range of wavelengths associated with low efficiency and/or low lifetime. The intensity of wavelengths of light other than the blue light can be adjusted either in addition to or instead of the blue light, without limitation.

Referring again to FIG. 1, system 100 can be configured to illuminate multiple areas or spaces independently. For example, area 130, which has no subjects present within it, can be illuminated with one set of wavelengths corresponding to higher efficiency and/or lower luminance or color temperature lighting, while area 135, which has two subjects 120 present within it, can be illuminated with a different set of wavelengths that corresponds to more desirable, yet potentially less efficient, lighting. However, the configuration of lighting panels 105 and sensors 110 in system 100 is not limited to any specific embodiment described herein, and can be any configuration, as would be understood by a person skilled in the art.

In various embodiments, the detection area of sensors 110 can be substantially the same as the illumination area, or the detection are can include an area outside of, or in addition to, the illumination area. For example, in one embodiment, one or more sensors 110 can detect a person while the person is still outside of a room, so that the wavelengths of emitted light can be changed inside the room before the person enters the room. Similarly, if system 100 is used to illuminate a walkway or parking lot, system 100 can be configured so that the illumination wavelengths of different areas of the walkway or parking lot are adjusted while a person moves through the different areas. Accordingly, sensors 110, lighting panels 105, and the controller can be configured to change the intensity of wavelengths of illumination in a manner that is more pleasing or less disruptive to any subjects passing through the illumination area.

Figure 2:
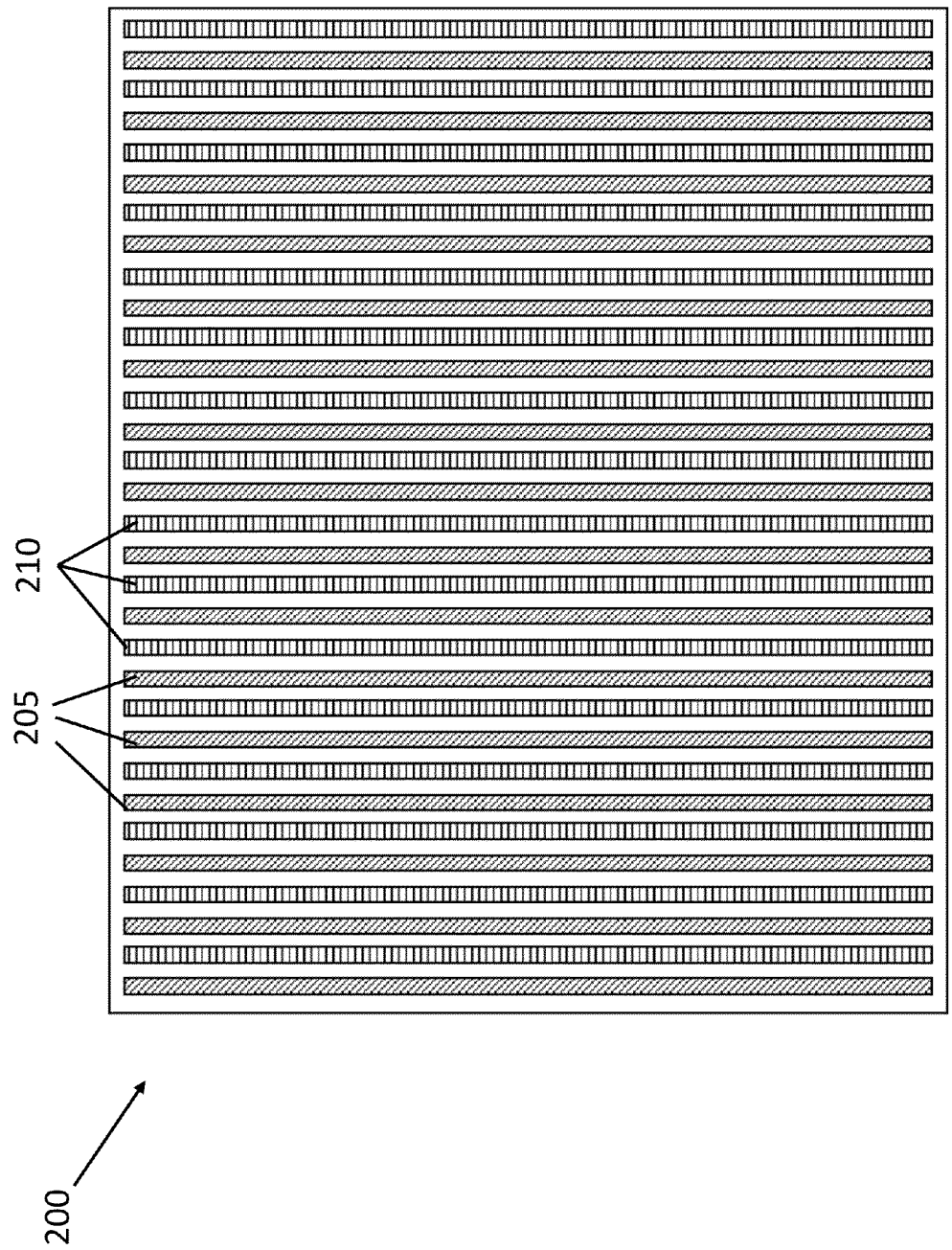
FIG. 2 is a diagram of an OLED lighting device having regions with individually controllable wavelengths.

Described herein are OLED devices having regions that can be independently controlled to emit light of different wavelengths. Referring now to FIG. 2, in one embodiment, light emitting device 200 can include two types of strips or regions 205, 210 that are associated with the emission of different wavelengths. In one embodiment, regions 205 can emit blue light while regions 210 can emit yellow light. In one embodiment, lighting device 200 can have more than two types of light emitting regions, for example regions independently associated with red, green, and blue light. In one embodiment, the different regions can be stacked, or otherwise overlap, instead of being adjacent to each other as shown in FIG. 2. However, the configuration of different regions and/or the wavelengths of light associated with different regions are not limited to any specific embodiment described, as would be understood by a person skilled in the art. As contemplated herein, in one embodiment, device 200 can emit primarily white light when operating least efficiently, e.g., when a subject is detected in the designated detection area, while emitting a different color light when operating most efficiently, e.g., yellow light when there is no subject present in the detection area. Exemplary materials and configurations of OLED lighting devices are provided in U.S. Pat. No. 7,663,300, which is hereby incorporated by reference in its entirety.

The one or more sensors used for the systems and devices described herein can be any suitable sensor, as would be understood by a person skilled in the art. In some embodiments, the sensor can be any sensor useful for detecting the presence of a subject in a designated area, such as a thermal sensor, a motion sensor, a pressure sensor, or a camera. In other embodiments, the sensor can be used to detect an input other than the presence or absence of a subject in a designated area. Other non-limiting examples of sensors include passive infrared (PIR), ultrasonic, and microwave. Further, BLUETOOTH or other wireless communication standards can be used as a sensor to detect a subject's cellphone, wearable device, or any other type of electronic device. As contemplated herein, more than one type of sensor can be used in some embodiments.

The controller used for the systems and devices described herein can be any suitable controller, as would be understood by a person skilled in the art. For example, the controller can include any suitable microprocessor. Further, the controller can be programmed to direct the illumination devices in any suitable manner to optimize the efficiency and lifetime of the illumination devices based on inputs from the sensors. In one embodiment, the controller can change the intensity of the wavelengths of emitted light of one or more connected light emitting devices immediately upon receiving a triggering input. In another embodiment, the controller can implement a time delay in changing the intensity of the wavelengths of emitted light of one or more connected light emitting devices upon receiving a triggering input. The controller can also implement a combination thereof. For example, when a person enters the designated area, the controller can immediately change the emitted light to be a white color, but when the person leaves the designated area, the controller can delay the change to higher-efficiency lighting for a predetermined amount of time. In one embodiment, the controller can also include components for receiving inputs from a source other than the sensors, such as wired or wireless communication from a user in a control center, or from a mobile device being carried by one or more subjects entering and exiting the designated spaces as described herein.

In certain embodiments, the systems and devices described herein can include controller hub for receiving information from one or more sensors and directing one or more light emitting devices to alter its light output based on the information received from the one or more sensors. As contemplated herein, the controller hub may be a standard computing device having at least one processor, standard input and output devices, as well as all hardware and software typically found on computing devices for storing data and running programs, and for sending and receiving data over a network. The controller hub may be scalable and include multiple computing units. Further, the controller hub can be a stationary unit or can be portable or mobile.

Described herein are methods for improving the lifetime and/or efficiency of illumination devices by adjusting the wavelengths of light emitted based on an input from one or more sensors. In one embodiment, the input is the detection, or lack of detection, of a subject in a designated space.

Figure 3:
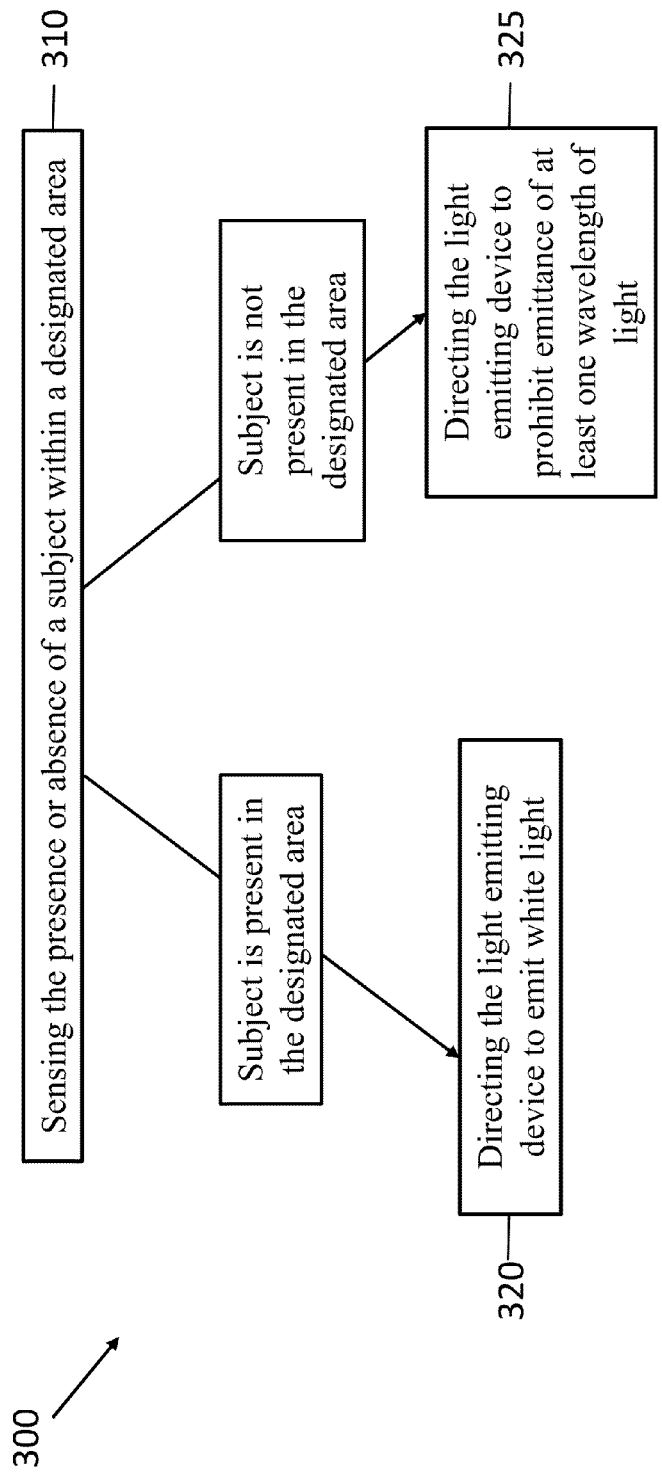
FIG. 3 is a diagram of a method for increasing the efficiency and lifetime of a light emitting device.

Referring now to FIG. 3, a diagram of an exemplary method of improving the lifetime and/or efficiency of a light emitting device is shown. Method 300 includes the step of sensing the presence or absence of a subject with a designated area (310). If a subject is detected in the designated area, the light emitting device is directed to emit white light (320), or at least directed to emit light including all or most of the potential wavelengths that can be emitted from the light emitting device. If a subject is not detected in the designated area, the light emitting device is directed to prohibit or reduce emittance of at least one wavelength of light (325). As described herein, the at least one wavelength of light prohibited can be the wavelength, or range of wavelengths, associated with the lowest efficiency and/or lifetime.

In other embodiments, the sensors can be used to detect other inputs instead of, or in addition to, the presence of subject. In one embodiment, sensors can be used to detect the intensity and/or wavelengths of ambient lighting. For example, the intensity of different wavelengths emitted from the illumination device can be adjusted when used in an outdoor setting to account for other artificial lighting present nearby, or to account for changes in ambient light associated with the time of day, i.e., dusk versus night.

The systems and methods described can be used to adjust various characteristics of the emitted light. In one embodiment, the light color temperature can be adjusted based on the presence or absence of a subject in a designated space. For example, in one embodiment, when a subject is not detected in the designated space the light color temperature of emitted light is less than about 2500 K, and when a subject is detected in the designated space the light color temperature of emitted light is greater than about 2700 K. In another embodiment, when a subject is not detected in the designated space the light color temperature of emitted light is less than about 2000 K, and when a subject is detected in the designated space the light color temperature of emitted light is greater than about 2500 K.

In other embodiments, the luminance of emitted light can be adjusted based on the presence or absence of a subject in a designated space. For example, in one embodiment, when a subject is not detected in the designated space the luminance of the emitted light is reduced by at least 25% and the power consumption of the light emitting device is reduced by at least 40%. In another embodiment, when a subject is not detected in the designated space the luminance of the emitted light is reduced by at least 50% and the power consumption of the light emitting device is reduced by at least 70%. However, the systems and methods are not limited to the light color temperature values and/or changes in luminance specifically described herein and can include any adjustments in the characteristics of emitted light that can be associated with improved efficiency and/or lifetime of the illumination devices, as would be understood by a person skilled in the art.

As would be understood by a person skilled in the art, the systems and method described herein can also be used to adjust the wavelengths of emitted light for a reason other than efficiency or increasing the lifetime of the lighting panels. For example, in one embodiment, wavelengths of emitted light can be adjusted for security purposes by changing the wavelengths of emitted light to be harsher or more undesirable to a subject entering an area, thereby increasing the chances that the subject will wish to leave area.

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

The invention claimed is:

1. A system for modulating the color output of a light emitting device, comprising:
    at least one light emitting device having at least two individually controllable wavelengths;
    at least one sensor for detecting the presence of a subject in a designated space; and
    a controller communicatively connected to the at least one sensor and the at least one light emitting device,
    wherein the controller directs the at least one light emitting device to change the color output of emitted light when the at least one sensor detects the presence of a subject in the designated space, and
    wherein when a subject is not detected in the designated space the emission of the controllable wavelength with the shortest lifetime or the lowest efficiency is reduced.

2. The system of claim 1, wherein the at least one light emitting device is an OLED device.

3. The system of claim 1, wherein the at least one light emitting device comprises at least one lighting panel.

4. The system of claim 3, wherein each lighting panel is individually controlled.

5. The system of claim 3, wherein each lighting panel comprises a blue light emitting region and a yellow light emitting region.

6. The system of claim 5, wherein the yellow light emitting region comprises a red light emitting region and a green light emitting region.

7. The system of claim 5, wherein the controller directs the at least one light emitting device to reduce emittance of blue light when a subject is not detected by the at least one sensor.

8. The system of claim 1, wherein the at least one sensor is selected from the group consisting of a thermal sensor, a motion sensor, a pressure sensor, and a camera.

9. The system of claim 1, wherein the at least one light emitting device is configured to emit light in an area outside of the designated space.

10. The system of claim 1, wherein when a subject is not detected in the designated space the light color temperature of emitted light is less than about 2500 K, and when a subject is detected in the designated space the light color temperature of emitted light is greater than about 2700 K.

11. The system of claim 1, wherein when a subject is not detected in the designated space the luminance of the emitted light is reduced by at least 25% and the power consumption of the light emitting device is reduced by at least 40%.

12. The system of claim 5, wherein the blue and yellow light emitting regions are individually controlled within each lighting panel.

13. The system of claim 12, wherein the controller directs the at least one light emitting device to emit yellow light when a subject is not detected by the at least one sensor.

14. The system of claim 7, wherein the blue light emittance is reduced by at least 20%.

15. The system of claim 7, wherein the blue light emittance is reduced by at least 50%.

16. The system of claim 5, wherein the controller directs the at least one light emitting device to increase emittance of blue light when a subject is detected by the at least one sensor.

17. An OLED lighting device, comprising:
    a lighting panel having at least two individually controllable wavelength emitting regions;
    at least one sensor; and
    a controller communicatively connected to the lighting panel and at least one sensor;
    wherein the controller individually directs the output of light emitted from the at least one of the at least two individually controllable wavelength emitting regions of the lighting panel based on a signal received from the sensor;
    wherein the signal received from the sensor is indicative of the presence or absence of a subject within a designated region, and
    wherein when the signal indicates the absence of a subject within the designated region, the emission of the controllable wavelength with the shortest lifetime or the lowest efficiency is reduced.

18. A method for increasing the efficiency and lifetime of a light emitting device, comprising:
    sensing the presence or absence of a subject within a designated area having a light emitting device with at least two individually controllable wavelengths;
    directing the light emitting device to emit white light when a subject is present in the designated area; and
    directing the light emitting device to prohibit or reduce emittance of at least one wavelength of light when a subject is absent from the designated area,
    wherein the at least one wavelength prohibited or reduced when a subject is absent from the designated area is the wavelength with the shortest emission lifetime or the lowest emission efficiency.

19. The method of claim 18, wherein when a subject is not detected in the designated space the light color temperature of emitted light is less than about 2500 K, and when a subject is detected in the designated space the light color temperature of emitted light is greater than about 2700 K.

20. The method of claim 18, wherein when a subject is not detected in the designated space the luminance of the emitted light is reduced by at least 25% and the power consumption of the light emitting device is reduced by at least 40%.

* * * * *